US010996663B2

(12) United States Patent
Gaydos et al.

(10) Patent No.: US 10,996,663 B2
(45) Date of Patent: May 4, 2021

(54) METHOD AND SYSTEM FOR PROVIDING QUALITY CONTROLLED DATA FROM A REDUNDANT SENSOR SYSTEM

(71) Applicant: University Corporation for Atmospheric Research, Boulder, CO (US)

(72) Inventors: Andrew Gaydos, Broomfield, CO (US); Robert Kent Goodrich, Boulder, CO (US); Scott Landolt, Arvada, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 381 days.

(21) Appl. No.: 16/175,496

(22) Filed: Oct. 30, 2018

(65) Prior Publication Data

US 2020/0133250 A1 Apr. 30, 2020

(51) Int. Cl.

*G05B 23/02* (2006.01)
*G06F 17/18* (2006.01)
*G06F 17/15* (2006.01)
*G01W 1/18* (2006.01)

(52) U.S. Cl.

CPC ............ *G05B 23/024* (2013.01); *G01W 1/18* (2013.01); *G06F 17/15* (2013.01); *G06F 17/18* (2013.01)

(58) Field of Classification Search

None

See application file for complete search history.

(56) References Cited

U.S. PATENT DOCUMENTS 6,594,620 B1 * 7/2003 Qin .......................... G05B 9/02 702/183

FOREIGN PATENT DOCUMENTS

WO WO1995004678 A * 2/1995 ............ B64D 15/20

* cited by examiner

*Primary Examiner* — Roy Y Yi

(74) *Attorney, Agent, or Firm* — The Ollila Law Group LLC

(57) ABSTRACT

A method for determining a quality controlled sensor set from a redundant sensor set comprising calculating a first time correlation coefficient and a first autocorrelation coefficient based on a first sensor time series data, calculating a second time correlation coefficient and a second autocorrelation coefficient based on a second sensor time series data, calculating a first and second sensor correlation coefficient based on the first sensor time series data and the second sensor time series data, and determining the quality controlled sensor set with a highest confidence level.

20 Claims, 10 Drawing Sheets

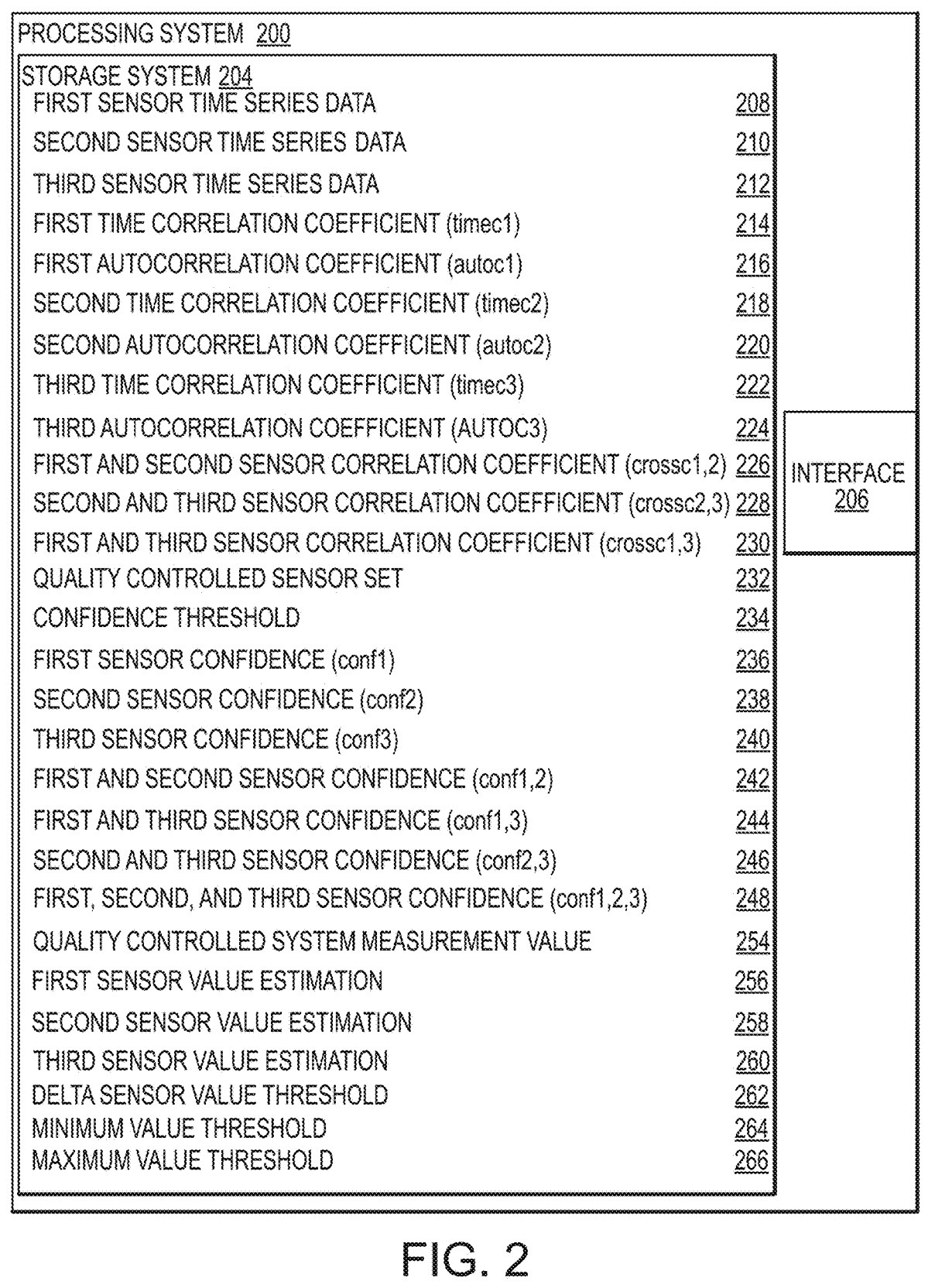

PROCESSING SYSTEM 200

STORAGE SYSTEM 204

| | |
|---|---|
| FIRST SENSOR TIME SERIES DATA | 208 |
| SECOND SENSOR TIME SERIES DATA | 210 |
| THIRD SENSOR TIME SERIES DATA | 212 |
| FIRST TIME CORRELATION COEFFICIENT (timec1) | 214 |
| FIRST AUTOCORRELATION COEFFICIENT (autoc1) | 216 |
| SECOND TIME CORRELATION COEFFICIENT (timec2) | 218 |
| SECOND AUTOCORRELATION COEFFICIENT (autoc2) | 220 |
| THIRD TIME CORRELATION COEFFICIENT (timec3) | 222 |
| THIRD AUTOCORRELATION COEFFICIENT (AUTOC3) | 224 |
| FIRST AND SECOND SENSOR CORRELATION COEFFICIENT (crossc1,2) | 226 |
| SECOND AND THIRD SENSOR CORRELATION COEFFICIENT (crossc2,3) | 228 |
| FIRST AND THIRD SENSOR CORRELATION COEFFICIENT (crossc1,3) | 230 |
| QUALITY CONTROLLED SENSOR SET | 232 |
| CONFIDENCE THRESHOLD | 234 |
| FIRST SENSOR CONFIDENCE (conf1) | 236 |
| SECOND SENSOR CONFIDENCE (conf2) | 238 |
| THIRD SENSOR CONFIDENCE (conf3) | 240 |
| FIRST AND SECOND SENSOR CONFIDENCE (conf1,2) | 242 |
| FIRST AND THIRD SENSOR CONFIDENCE (conf1,3) | 244 |
| SECOND AND THIRD SENSOR CONFIDENCE (conf2,3) | 246 |
| FIRST, SECOND, AND THIRD SENSOR CONFIDENCE (conf1,2,3) | 248 |
| QUALITY CONTROLLED SYSTEM MEASUREMENT VALUE | 254 |
| FIRST SENSOR VALUE ESTIMATION | 256 |
| SECOND SENSOR VALUE ESTIMATION | 258 |
| THIRD SENSOR VALUE ESTIMATION | 260 |
| DELTA SENSOR VALUE THRESHOLD | 262 |
| MINIMUM VALUE THRESHOLD | 264 |
| MAXIMUM VALUE THRESHOLD | 266 |

INTERFACE 206

FIG. 2

METHOD AND SYSTEM FOR PROVIDING QUALITY CONTROLLED DATA FROM A REDUNDANT SENSOR SYSTEM

GOVERNMENT LICENSE RIGHTS

This invention was made with Government support under awards DTFAWA15D0003 awarded by the Federal Aviation Administration. The Government has certain rights in this invention.

TECHNICAL FIELD

The examples described below relate to a method and system for validating data. More particularly, the examples are directed to a method and system for determining a quality controlled data set from a multiple redundant sensor set.

BACKGROUND

Weather instrument observations provide important data that are often used to make critical aircraft safety decisions. For example, measurements of Liquid Water Equivalent (LWE) precipitation amounts and temperature may be used at an airport to determine when aircraft wings require de-icing for safe take off. Individual weather sensors can produce errors in observations and measurements, however, so redundant sensors are often used, and their data combined, to provide more accurate measurements. For example, a single precipitation gauge may include multiple internal measurement sensors. Some of those sensors may provide bad data if a sensor is experiencing an anomaly, however. Even when sensors are functioning properly, interference from other sources (i.e. power cables, radio communications, etc.) can produce faulty measurements on a short-term basis. In practice, the interference caused by these sources can cause noise in the data that can be difficult to differentiate from actual weather events.

Erroneous data from weather sensors are particularly problematic because of the impact to end users, such as establishing incorrect aircraft icing holdover times or impacting climatological observations. Erroneous data may further cause operators to lose confidence in the information they are receiving. Because data from an individual sensor are more prone to noise effects related to interference and, in some cases, a faulty sensor, it is necessary to develop techniques to flag that data and/or remove it from the data stream.

As sensors, communication, and data collection systems become cheaper, it becomes easier to purchase and/or build systems that can take advantage of redundant sensor measurements. When redundant, co-located systems/sensors are available, data from the individual sensors can be compared to evaluate whether the data from any one sensor was correlated to the data from the other sensors. Oftentimes this is done after the data was collected, making it less useful to end users who may need to know the information on a real-time basis. Applying this Quality Control (QC) process can still be useful, especially for climatological studies, but it can be labor intensive to do on a regular basis. This methodology may fail to identify when one sensor provides consistently faulty data, though. An example of this would be if the sensor is drifting out of calibration.

Thus, a more robust way to identify a faulty or noisy sensor, or a way to flag erroneous measurements from a redundant set of sensors is needed.

SUMMARY

According to an embodiment a method for determining a quality controlled sensor set from a redundant sensor set is provided. The method comprises calculating a first time correlation coefficient (timec1) and a first autocorrelation coefficient (autoc1) based on a first sensor time series data, calculating a second time correlation coefficient (timec2) and a second autocorrelation coefficient (autoc2) based on a second sensor time series data, and calculating a first and second sensor correlation coefficient (crossc1,2) based on the first sensor time series data and the second sensor time series data. The quality controlled sensor set with a highest confidence level is determined based on the timec1, the autoc1, the timec2, the autoc2, and the crossc1,2.

According to an embodiment, a system for determining a quality controlled sensor set from a redundant sensor set is provided. The system comprises a time correlation calculation module configured to calculate a first time correlation coefficient (timec1) and a first autocorrelation coefficient (autoc1) based on a first sensor time series data, and calculate a second time correlation coefficient (timec2) and a second autocorrelation coefficient (autoc2) based on a second sensor time series data. The system further comprises a sensor correlation calculation module configured to calculate a first and second sensor correlation coefficient (crossc1,2) based on the first sensor time series data and the second sensor time series data. The system further comprises a quality controlled sensor determination module configured to determine the quality controlled sensor set with a highest confidence level based on the timec1, the autoc1, the timec2, the autoc2, the crossc1,2, and the crossc2,3.

BRIEF DESCRIPTION OF THE DRAWINGS

The same reference number represents the same element on all drawings. The drawings are not necessarily to scale.

FIG. 2 depicts system 200 in accordance with an embodiment;

DETAILED DESCRIPTION

The present disclosure describes a method and system for determining a quality controlled sensor set from a redundant sensor set.

Figure 1:
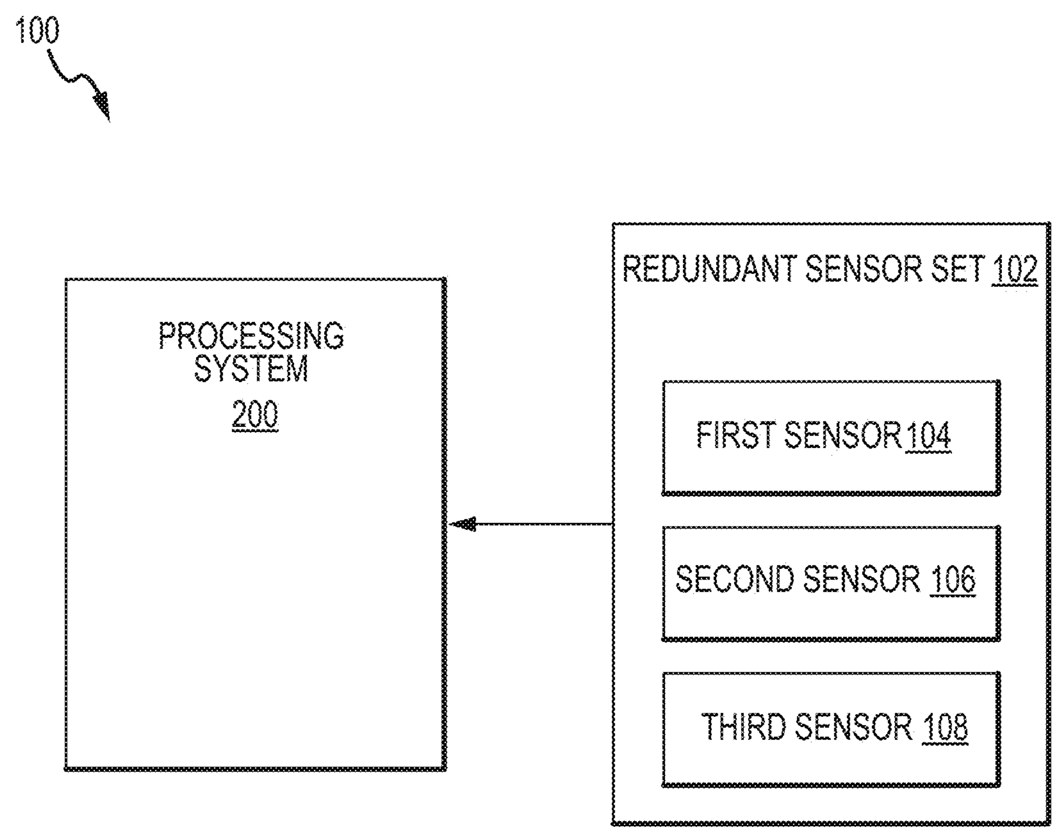
FIG. 1 depicts processing system 100 in accordance with an embodiment.
Figure 3A:
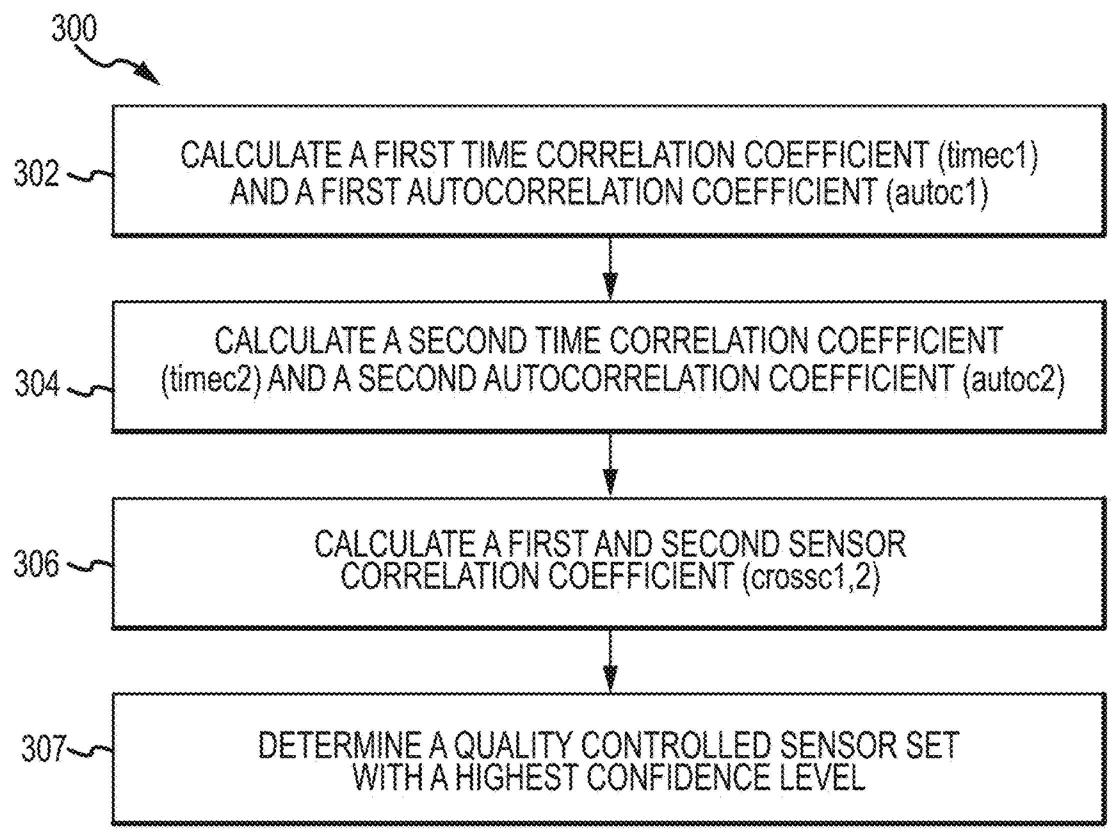
FIG. 3A depicts method 300 in accordance with an embodiment.
Figure 3B:
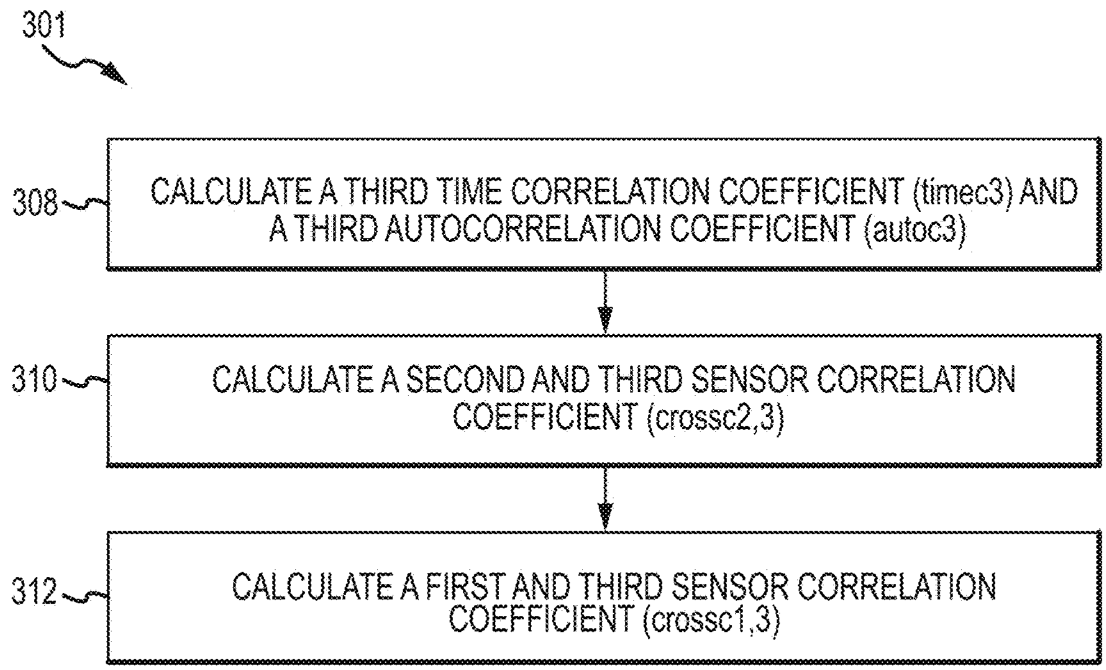
FIG. 3B depicts method 301 in accordance with an embodiment.
Figure 4:
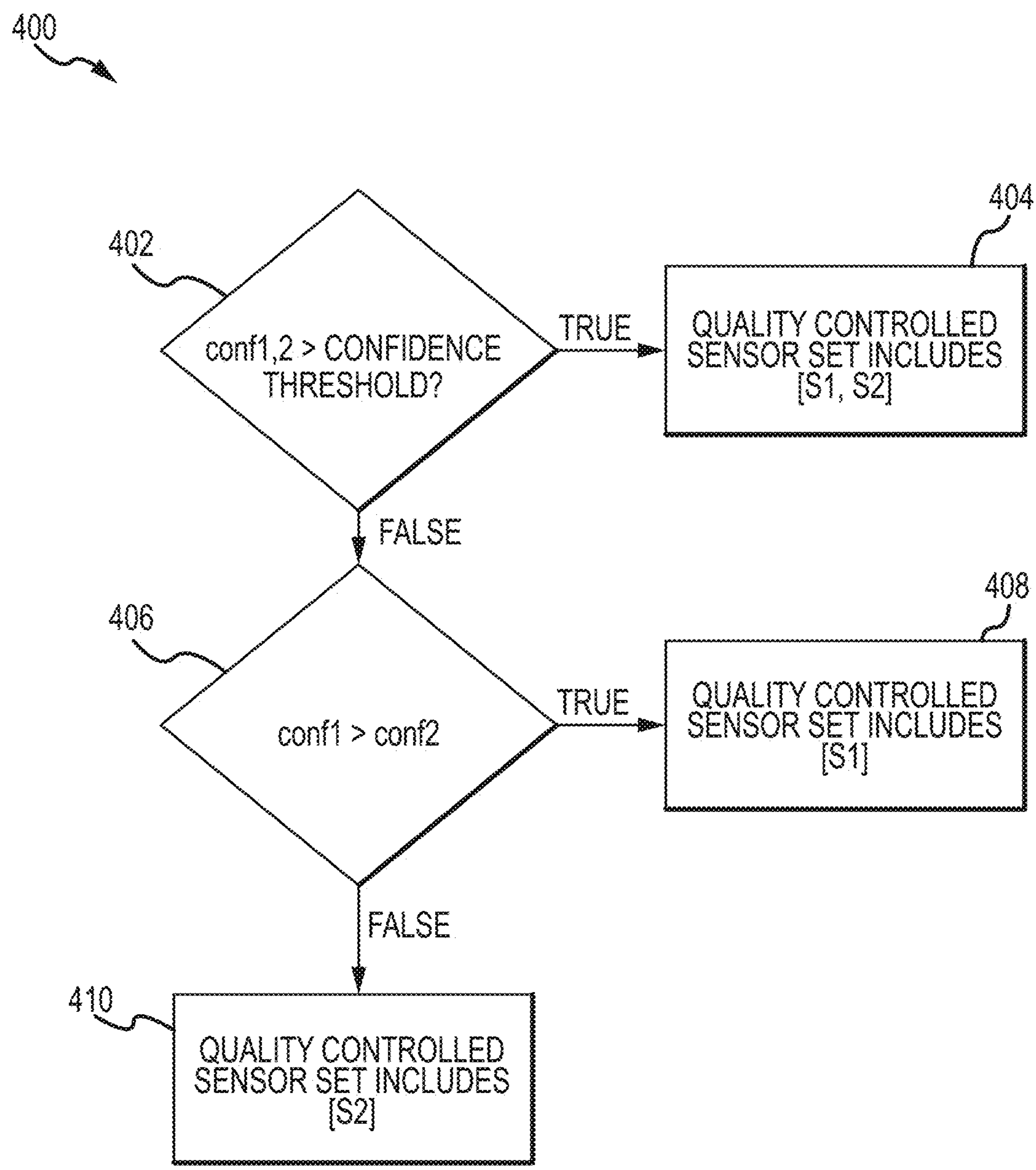
FIG. 4 depicts method 400 in accordance with an embodiment.
Figure 5:
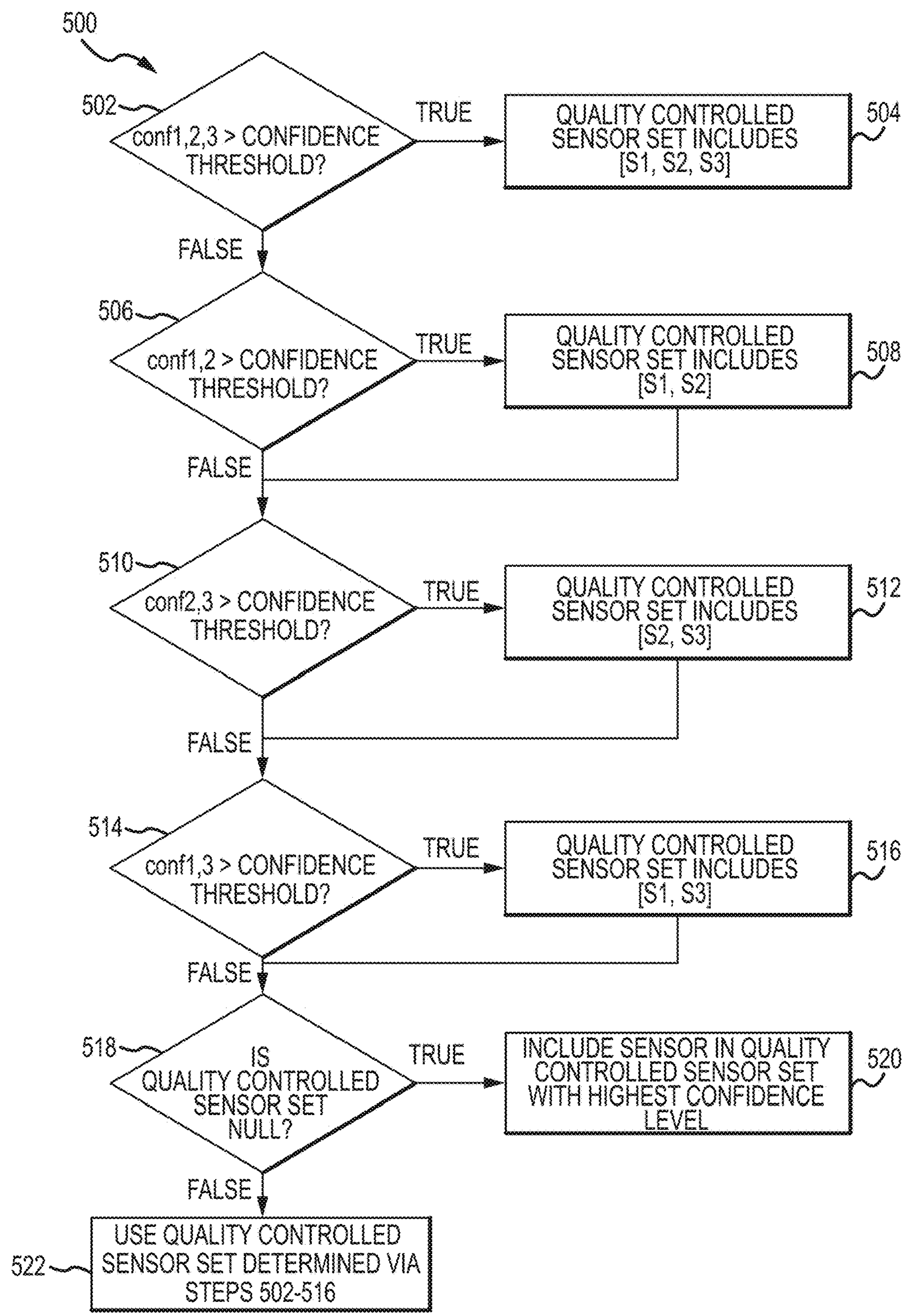
FIG. 5 depicts method 500 in accordance with an embodiment.
Figure 6:
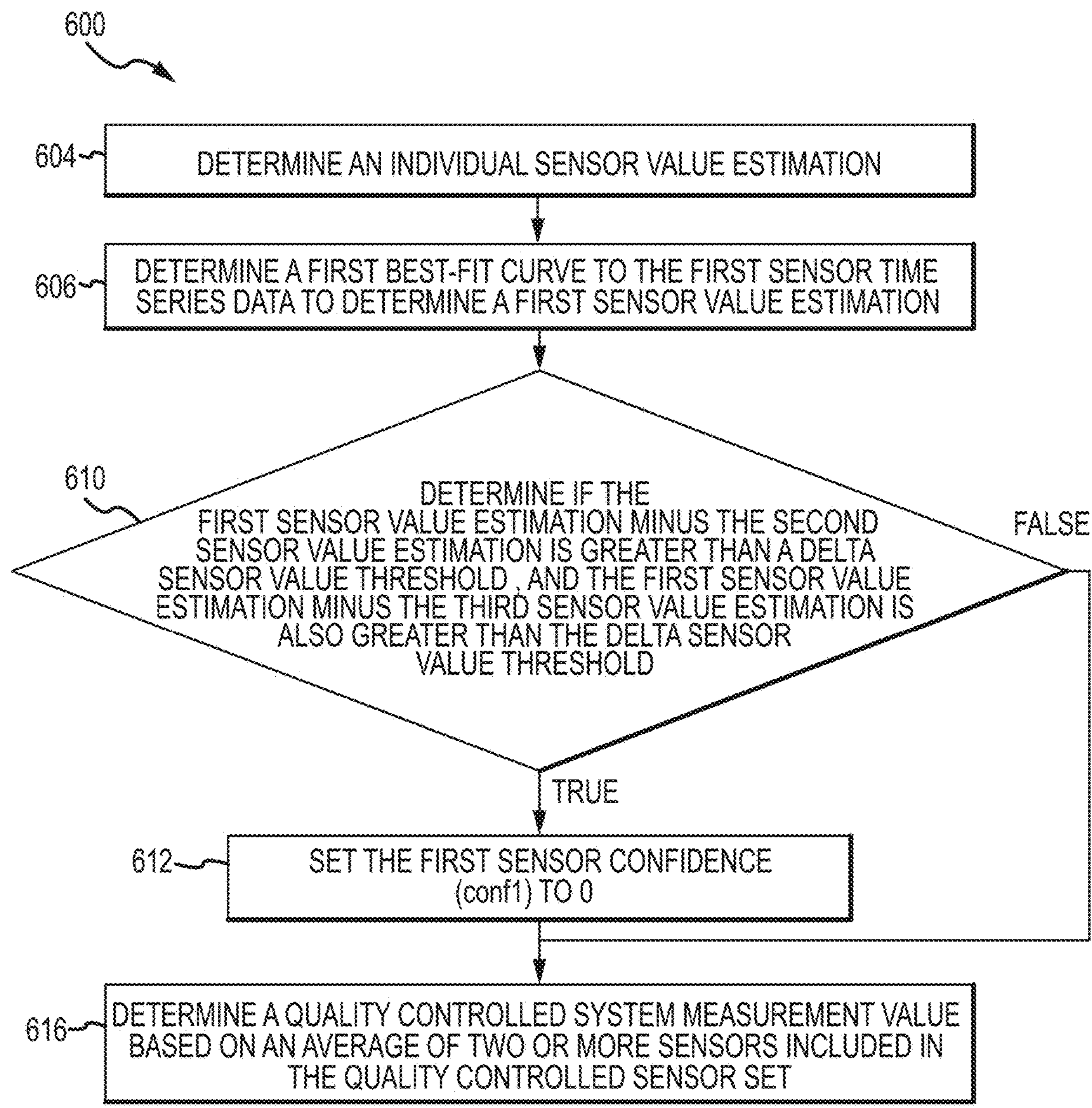
FIG. 6 depicts method 600 in accordance with an embodiment.
Figure 7:
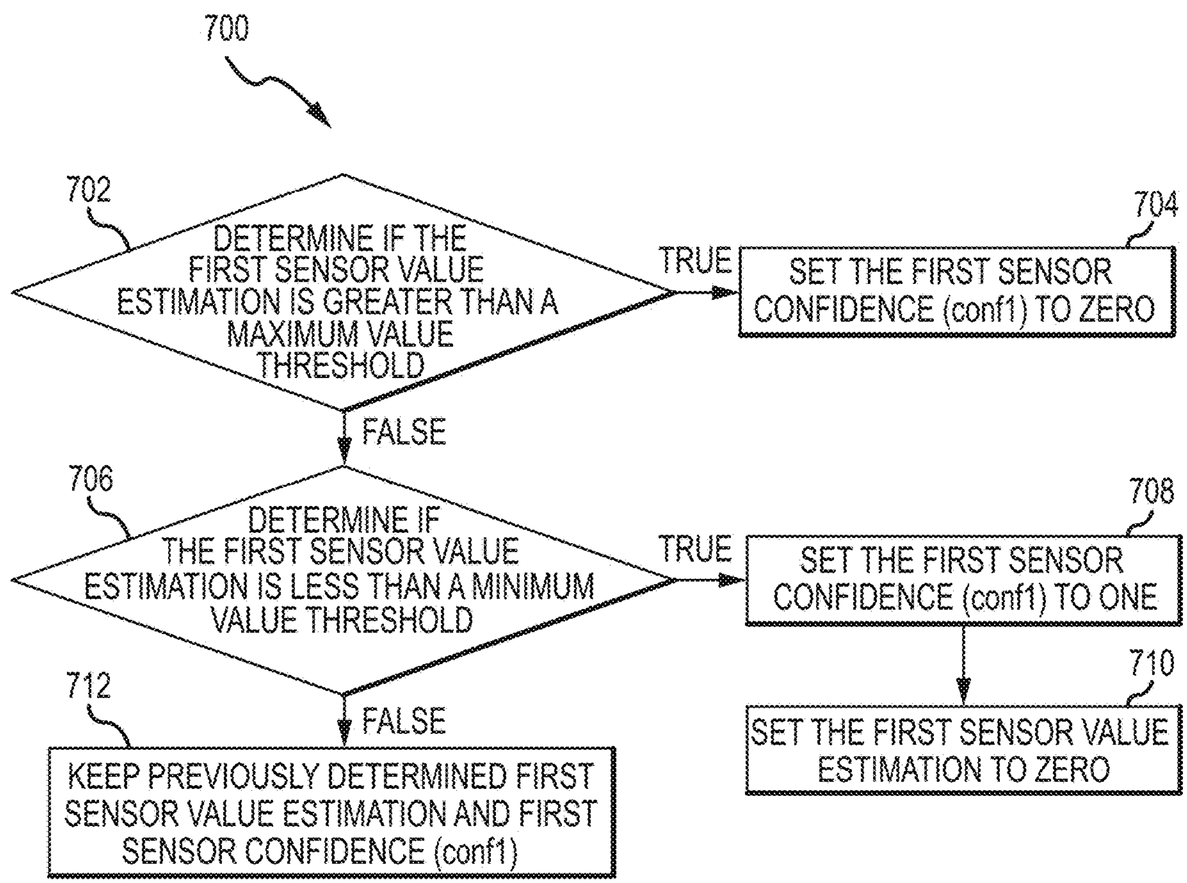
FIG. 7 depicts method 700 in accordance with an embodiment.
Figure 8:
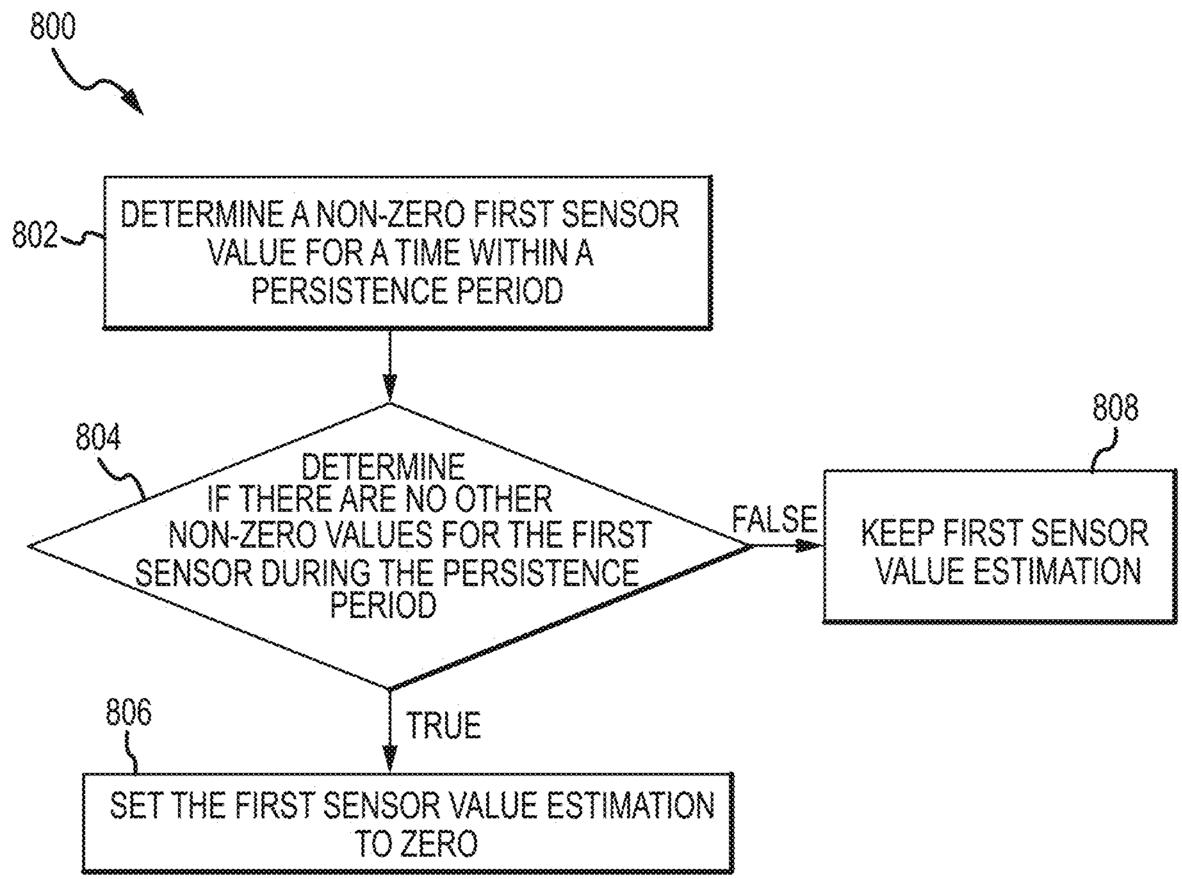
FIG. 8 depicts method 800 in accordance with an embodiment.

FIG. 1 depicts a system 100 in accordance with an embodiment. System 100 may be used to determine a quality controlled sensor set from a redundant sensor set. System 100 includes processing system 100 and redundant sensor set 102. Redundant sensor set 102 includes a first sensor 104, a second sensor 106, and a third sensor 108. Redundant sensor set 102 includes a set of sensors that measure approximately the same data. For example, the redundant sensor set may be co-located in such a way that each sensor is measuring approximately the same physical event. For example, redundant sensors may include co-located precipitation gauges, wind sensors, temperature sensors, pressure sensors, or other sensors, as will be understood by those of skill.

A quality controlled sensor set is one or more sensors from a redundant sensor set that is determined to be providing valid data, as will be further described below.

FIG. 2 depicts a processing system 200 according to an embodiment. Processing system 200 is an example embodiment of a system that may be used to determine a quality controlled sensor set from a redundant sensor set. Processing system 200 may further be used to determine a quality controlled system measurement value from a quality controlled sensor set. Processing system 200 may comprise a general-purpose computer, a micro-processing system, a logic circuit, or any other general purpose or customized processing device capable of performing the functions described herein. Processing system 200 may be distributed among multiple processing devices. Processing system 200 may include any manner of integral or independent electronic storage medium, such as storage system 204.

Interface 206 may receive data from a redundant sensor set including one or more sensors. Interface 206 may enable communications between processing system 200 and external devices. In addition, interface 206 may enable communications between processing system 200 and external devices, for example. Interface 206 may be capable of any manner of electronic, optical, wireless or other communication.

Storage system 204 may store meter parameters and data, software routines, constant values, and variable values. Storage system 204 may comprise a primary or main memory, such as a Random Access Memory (RAM). In examples, storage system 204 may include a hard disk drive, a removable storage device, a memory card, a floppy disk drive, a magnetic tape drive, a compact disk drive, a digital versatile disc, a Blue-ray disc, an optical storage device, tape backup, or any other computer useable or readable storage medium. In examples, storage system 204 may comprise a non-transitory media.

In embodiments, the storage system 204 may include routines that are executed by the processing system 200. For example, storage system 204 may include routines that execute any portion of system 200, or methods 300-600, as described below.

Storage system 204 may further store variables used by routines executed by processing system 200 to determine a quality controlled sensor set of a redundant sensor set, or to determine a quality controlled system measurement value, as will be described below. For example, storage system 204 may include, but is not limited to: first sensor time series data 208, second sensor time series data 210, third sensor time series data 212, first time correlation coefficient (timec1) 214, first autocorrelation coefficient (autoc1) 216, second time correlation coefficient (timec2) 218, second autocorrelation coefficient (autoc2) 220, third time correlation coefficient (timec3) 222, third autocorrelation coefficient (autoc3) 224, first and second wire correlation coefficient (crossc1,2) 226, second and third wire correlation coefficient (crossc2,3) 228, first and third wire correlation coefficient (crossc1,3) 230, quality controlled sensor set 232, confidence threshold 234, first sensor confidence (conf1) 236, second sensor confidence (conf2) 238, third sensor confidence (conf3) 240, first and second sensor confidence (conf1,2) 242, first and third sensor confidence (conf1,3) 244, second and third sensor confidence (conf2,3) 246, first, second, and third sensor confidence (conf1,2,3) 248, quality controlled system measurement value 254, first sensor value estimation 256, second wire value estimation 258, third wire value estimation 260, delta sensor value threshold 262, minimum value threshold 264, and maximum value threshold 266. Each of these variables will be described in further detail below.

FIGS. 3A, 3B, 4, 5, 6, 7, and 8 depict methods 300, 301 400, 500, 600, 700, and 800 respectively. FIG. 3 depicts method 300 in accordance with an embodiment. Method 300 may be used to determine a quality controlled sensor set from a redundant sensor set.

The redundant sensor set may include several sensors physically positioned near one another making approximately the same measurement, such as wind speed or temperature. Because the individual sensors of the redundant sensor set are approximately measuring the same physical phenomena, it may be assumed that each sensor should produce approximately the same data.

Method 300 begins with step 302. In step 302, a first-time correlation coefficient (timec1) 214 and a first autocorrelation coefficient (autoc1) 216 are calculated based on a first sensor time series data 208.

A first sensor time series data 208 may include two or more data measurements taken in series, or at different times, using a first sensor. In examples, the first sensor may be a weather instrument, for example a precipitation gauge, an anemometer, a thermometer, a barometer, etc. In other examples, the first sensor may be any other data-taking instrument known to those of skill. The first sensor time series data 208 may include data taken using any sampling period, providing a time series of measurements that may be received at processing system 200 to comprise first sensor time series data 208. In examples, first sensor time series data 208 comprise raw data from the first sensor. In further examples, however, first sensor time series data 208 may comprise filtered and/or smoothed time series data. In further examples, first sensor time series data 208 may comprise time series data subject to other data processing methods before step 302, as will be understood by those of skill.

First time correlation coefficient (timec1) 214 may indicate how well a set of data is fit by a line. A time correlation coefficient may be determined by comparing a sampled data series to a time series $X_1, X_2 \ldots X_n, t_1, t_2 \ldots t_n$. A time correlation coefficient $r_{X,t}$ may be determined using Equation 1 below:

$$r_{X,t} = \frac{\sum_{i=1}^{n}(X_i - \overline{X})(t_i - \bar{t})}{\left(\sum_{i=1}^{n}(X_i - \overline{X})^2\right)^{1/2}\left(\sum_{i=1}^{n}(t_i - \bar{t})^2\right)^{1/2}}. \quad \text{(Equation 1)}$$

When time correlation coefficient $r_{X,t}$ squared is close to one, this indicates that the least squares fit best explains most of the variance in the sampled data, and the rate can thus be defined by the slope of the line. The rate $r_X$ may be defined according to Equation 2 below:

$$r_X = \frac{\sum_{i=1}^{n} (X_i - \overline{X})(t_i - \overline{t})}{\sum_{i=1}^{n} (t_i - \overline{t})^2}. \quad \text{(Equation 2)}$$

First autocorrelation coefficient (autoc1) 216 is the correlation of a signal with a delayed copy of itself as a function of delay. Autocorrelation may help indicate the quality of data.

An autocorrelation coefficient may be determined by comparing a sampled data series to a time-shifted sample data series. For example, a sample data series $X_1, X_2 \ldots X_{n-1}$ may be shifted one unit from a time-shifted sample data series $X_2, X_3 \ldots X_n$. In further examples, however, the sampled data may be time shifted any number of units of time from the time-shifted data, as will be understood by one of skill.

It is possible to define an autocorrelation coefficient $r_{X,X}$ according to Equation 3 below:

$$r_{X,X} = \frac{\sum_{i=1}^{n} (X_i - A_1)(X_{i+1} - A_2)}{\left(\sum_{i=1}^{n} (X_i - A_1)^2\right)^{1/2} \left(\sum_{i=1}^{n} (X_i - A_2)^2\right)^{1/2}}, \text{ where} \quad \text{(Equation 3)}$$

$$A_1 = \frac{\sum_{i=1}^{n-1} X_i}{n-1} \text{ and } A_2 = \frac{\sum_{i=2}^{n} X_i}{n-1}.$$

For uncorrelated data, the autocorrelation coefficient $r_{X,X}$ will be close to zero. For well-correlated data, the autocorrelation coefficient $r_{X,X}$ will be closer to one. The autocorrelation coefficient $r_{X,X}$ is a measurement of data quality.

Method 300 continues with step 304. In step 304, a second time correlation coefficient (timec2) 218 and a second autocorrelation coefficient (autoc2) 220 are calculated based on a second sensor time series data 210. Second time correlation coefficient (timec2) 218, second autocorrelation coefficient (autoc2) 220, and second sensor time series data 210 are similar to first time correlation coefficient (timec2) 214, first autocorrelation coefficient (autoc1) 216, and first sensor time series data 208, respectively.

Method 300 continues with step 306. In step 306, a first and second sensor correlation coefficient (crossc1,2) 226 is calculated based on the first sensor time series data 208 and the second sensor time series data 210. Cross correlation is the normalized cross-covariance function, and it may measure the correlation between the first sensor time series data 208 and the second sensor time series data 210.

A cross-correlation coefficient may be determined as follows. Given samples of two random variables $X_1, X_2 \ldots X_n, Y_1, Y_2 \ldots Y_n$, it is possible to define the (sampled) cross-correlation coefficient between these two variables according to Equation 4 below:

$$r_{x,y} = \frac{S_{X,Y}}{\sqrt{S_{X,X}}\sqrt{S_{Y,Y}}}, \text{ where} \quad \text{(Equation 4)}$$

-continued $$S_{X,Y} = \frac{\sum_{i=1}^{n} (X_i - \overline{Y})(Y_i - \overline{Y})}{n},$$

$$S_{X,X} = \frac{\sum_{i=1}^{n} (X_i - \overline{X})^2}{n},$$

$$S_{Y,Y} = \frac{\sum_{i=1}^{n} (Y_i - \overline{Y})^2}{n},$$

$$\overline{X} = \frac{\sum_{i=1}^{n} X_i}{n}, \text{ and } \overline{Y} = \frac{\sum_{i=1}^{n} Y_i}{n}.$$

The cross-correlation coefficient $r_{X,Y}$ satisfies $-1 \le r_{X,Y} \le 1$ and represents the degree of correlation between the two sampled variables. If $r_{X,Y} = \pm 1$ then the least squares best fit (regression line) is an exact relationship between these two variables for these samples. The quantity $r_{X,Y}^2$ represents the percentage of the variance in the data explained by the regression line.

Method 300 continues with step 307. In step 307, the quality controlled sensor set 232 with a highest confidence level is determined. Quality controlled sensor set 232 is the set of sensors from the redundant sensor set 102 that provide quality controlled data. For example, if a redundant sensor set 102 includes a first sensor (S1), a second sensor (S2), and a third sensor (S3), quality controlled sensor set 232 may comprise any of the following sets: [S1, S2, S3], [S1, S2], [S1, S3], [S2, S3], [S1], [S2], or [S3].

Each of example sensor sets [S1, S2, S3], [S1, S2], [S1, S3], [S2, S3], [S1], [S2], or [S3] for a three-sensor redundant sensor set may correspond to a separate confidence level. A confidence level indicates how likely it is that a measurement value based on data from the respective sensor set correctly indicates the property measured. In examples, the confidence level may scale between 0 and 1, with 0 representing the lowest confidence level and 1 representing the highest confidence level.

In examples, quality controlled sensor set 232 may comprise a set of sensors with a highest confidence level. For example, if it determined that example sensor set [S1, S2] has the highest confidence level of the example sets [S1, S2, S3], [S1, S2], [S1, S3], [S2, S3], [S1], [S2], or [S3], then quality controlled sensor set 232 may include the first and second sensors [S1, S2].

In examples, the quality controlled sensor set 232 with the highest confidence level is determined based on first time correlation coefficient (timec1) 214, first autocorrelation coefficient (autoc1) 216, second time correlation coefficient (timec2) 218, second autocorrelation coefficient (autoc2) 220, and first and second wire correlation coefficient (crossc1,2) 226.

By determining the confidence value for various potential quality controlled sensor sets 232 including the time correlation and the autocorrelation for each sensor, in addition to the cross correlations between the sensors, it may be possible to remove sensors from quality controlled sensor set 232 that are experiencing noise for intermittent time periods or that are not correlated to other sensors, for shorter or longer periods of time. This may provide a dynamically quality controlled sensor set from which a quality controlled measurement value may be determined using a combination of the greatest number of valid sensors at any instant of time.

In examples, step 307 of method 300 may further comprise any of the steps of method 400. Method 400 may be used for a two-sensor redundant sensor set 102 to determine if quality controlled sensor set 232 comprises [S1, S2], [S1], or [S2].

Method 400 begins with step 402. In step 402, it may be determined whether a first and second sensor confidence (conf1,2) 242 is over a confidence threshold 234, wherein conf1,2 is determined by Equation 5 below;

$$conf1{,}2 = \sqrt[5]{timec1 * autoc1 * timec2 * autoc2 * crossc1{,}2}. \quad \text{(Equation 5)}$$

If each of timec1, autoc1, timec2, autoc2, and croscorr1,2 are equal to 1, conf1,2 will also be one. Therefore, if first and second sensor confidence (conf1,2) 242 is determined to be close to 1, then it is possible to validate that the first and second sensors are providing good data quality, and that each sensor provides data that is a linear function of the other sensors. Equation 5 provides a single value for first and second sensor confidence (conf1,2) 242 that reflects whether both the first and second sensors are providing data correlated to their own previous time series data, and to one another's concurrent data.

If step 402 evaluates to be true, then method 400 may continue with step 404. In step 404, the quality controlled sensor set 232 with the highest confidence level may be determined to comprise the first sensor and the second sensor [S1, S2].

Equation 5 is just one non-limiting example of how to determine first and second sensor confidence (conf1,2) 242. Those of skill in the art will recognize that there may be other ways to combine timec1, autoc1, timec2, autoc2, and croscorr1,2 to generate first and second sensor confidence (conf1,2) 242.

Confidence threshold 234 represents a confidence level above which it may be presumed that a sensor set is valid. In examples, the confidence threshold 234 may be set to 0.95. In further examples, however, confidence threshold 234 may be set to another value based on the performance of redundant sensor set 102, as will be understood by those of skill.

Step 402 evaluates to be false if first and second sensor confidence (conf1,2) 242 is not determined to be above confidence threshold 234. If step 402 evaluates false, then method 400 may next evaluate the confidences of single sensor systems by continuing with step 406. In step 406, first sensor confidence (conf1) 236 for sensor system [S1] and second sensor confidence (conf2) 238 for sensor system [S2] may be determined. For example, first sensor confidence (conf1) 236 may be determined based on first time correlation coefficient (timec1) 214 and first autocorrelation coefficient (autoc1) 216, and second sensor confidence (conf2) 238 may be determined based on second time correlation coefficient (timec2) 218 and second autocorrelation coefficient (autoc2) 220 using Equation 6 below:

$$\text{conf}_A = \sqrt{\text{timec}A \times \text{autoc}A}. \quad \text{(Equation 6)}$$

Equation 6 is not intended to be limiting, however. In examples, it may be possible to determine the confidence level of a single sensor using other methods, as will be understood by those of skill.

Step 406 then determines if first sensor confidence (conf1) 236 is greater than second sensor confidence (conf2) 238. If first sensor confidence (conf1) 236 is determined to be greater than second sensor confidence (conf2) 238, method 400 continues with step 408. In step 408, the first sensor may be included in the quality controlled sensor set. If first sensor confidence (conf1) 236 is not determined to be greater than second sensor confidence (conf2) 238, method 400 continues with step 410. In step 410, the second sensor may be included in quality controlled sensor set 232.

In examples, method 300 may include further steps when redundant sensor set 102 includes at least three sensors. For example, method 300 may include any of the steps of method 301 and method 500.

Method 301, begins with step 308. In step 308, a third time-correlation coefficient (timec3) 222 and a third autocorrelation coefficient (autoc3) 224 may be calculated based on a third sensor time series data 212. Third time-correlation coefficient (timec3) 222 and third autocorrelation coefficient (autoc3) 224 may be determined similar to first time-correlation coefficient (timec1) 214 and first autocorrelation coefficient (autoc1) 216, as described above.

Method 301 continues with steps 310 and 312. In step 310, a second and third sensor correlation coefficient (crossc2,3) 228 may be calculated based on the second sensor time series data 210 and the third sensor time series data 212. In step 312, a first and third sensor correlation coefficient (crossc1,3) 230 may be calculated based on first sensor time series data 208 and the third sensor time series data 212. Second and third sensor correlation coefficient (crossc2,3) 228 and first and third sensor correlation coefficient (crossc1,3) 230 may be determined similar to first and third sensor correlation coefficient (crossc1,3) 226, as described above.

When at least three sensors are included in redundant sensor set 102, step 307 of method 300 may further include any of the steps of method 500. Method 500 begins by evaluating three-sensor set [S1, S2, S3] for inclusion in quality controlled sensor set 232 with step 502. In step 502, it may be determined whether a first, second, and third sensor confidence (conf1,2,3) 248 is over a confidence threshold 234. Conf1,2,3 may be determined by Equation 7:

$$conf1{,}2{,}3 = \sqrt[9]{\begin{matrix} timec1 * autoc1 * timec2 * autoc2 * timec3 * \\ autoc3 * crossc1{,}2 * crossc2{,}3 * crossc1{,}3 \end{matrix}} \quad \text{(Equation 7)}$$

If each of timec1, autoc1, timec2, autoc2, timec3, autoc3, croscorr1,2, croscorr2,3, and croscorr1,3 are equal to 1, conf1,2,3 will also be one. Therefore, if first, second, and third sensor confidence (conf1,2,3) 248 is evaluated to be close to 1, it is possible to validate that the first, second, and third sensors are providing good data quality, and that each sensor is providing data that is a linear function of the other sensor data.

Upon determining that step 502 evaluates true because first, second, and third sensor confidence (conf1,2,3) 248 is greater than confidence threshold 234, method 500 may continue with step 504. In step 504, quality controlled sensor set 232 may be determined to include the first, second, and third sensors [S1, S2, S3].

If it is determined that step 502 evaluates false, however, method 500 may continue to evaluate possible two-sensor sets for inclusion in quality controlled sensor set 232, including [S1, S2], [S1,S3], and [S2,S3], with step 506-516. In step 506, it may be determined whether first and second sensor confidence (conf1,2) 242 is greater than confidence threshold 234, similar to step 402 described above.

Upon evaluating step 506 to be true, method 500 may continue with step 508. In step 508, quality controlled sensor set 232 may be determined to include first sensor and second sensor [S1, S2], similar to step 404 described above.

Method 500 may continue with step 510 after step 506 evaluates false or step 508 has been performed. In step 510, it may be determined whether second and third sensor confidence (conf2,3) 246 is greater than confidence threshold 234, similar to steps 402 and 502 described above.

Upon evaluating step 510 to be true, method 500 may continue with step 512. In step 512, quality controlled sensor set 232 may be determined to include second sensor and third sensor [S2, S3].

Method 500 may continue with step 514 after step 510 evaluates false or step 512 has been performed. In step 514, it may be determined whether first and third sensor confidence (conf1,3) 244 is greater than confidence threshold 234. Upon evaluating step 514 to be true, method 500 may continue with step 516. In step 516, quality controlled sensor set 232 may be determined to include first sensor and third sensor [S1, S3].

After performing steps 506-516, it should be clear that if any two of first and second sensor confidence (conf1,2) 242, second and third sensor confidence (conf2,3) 246, or first and third sensor confidence (conf1,3) 244 are evaluated to be above confidence threshold 234 in steps 506, 510, and 514, quality controlled sensor set 232 will include all three sensors, [S1, S2, S3]. Quality controlled sensor set 232 will therefore not be null.

In examples, method 500 may continue with step 518. In step 518, it may be determined whether quality controlled sensor set 232 is null. Quality controlled sensor set 232 may be null at step 518, for example, if none of the possible two or three sensor sets [S1,S2,S3], [S1,S2], [S1,S3], or [S2,S3] were included in quality controlled sensor set 232 during steps 502-516.

If it is determined that quality controlled sensor set 232 is null at step 518, step 518 evaluates true and method 500 may continue to evaluate possible single sensor sets [S1], [S2], or [S3] for inclusion in quality controlled sensor set 232 in step 520. In step 520, the sensor from redundant sensor set 102 with the highest confidence level may be included in quality controlled sensor set 232. For example, each of first sensor confidence (conf1) 236, second sensor confidence (conf2) 238, and/or third sensor confidence (conf3) 240 may be determined using Equation 6 above. The corresponding sensor [S1], [S2], [S3] may be included in quality controlled sensor set 232.

If it is determined that step 518 evaluates false because quality controlled sensor set 232 is not null, however, then method 500 may continue with step 522. In step 522, the previously determined quality controlled sensor set 232 determined by performing any of steps 502-516 may be used.

In examples, method 300 may further include any of the steps of methods 600, 700, 800, preferably after quality controlled sensor set 232 is determined in step 307, as will be further described below.

In examples, method 300 may further include any of the steps of method 600. Method 600, which includes steps that may be performed after quality controlled sensor set 232 has been determined, begins with step 604. In step 604, an individual sensor value estimation may be determined. For example, first sensor value estimation 256, second sensor value estimation 258, or third sensor value estimation 260 may be determined based on first sensor time series data 208, second sensor time series data 210, or third sensor time series data 212, respectively.

In examples, method 300 may include step 606. In step 606, a first best-fit curve may be fit to the first sensor time series data to determine first sensor value estimation 256. The curve may be a function including any straight or curved line that has a best fit to the first sensor time series data 208, as will be understood by those of skill.

In examples, method 300 may further include steps 610 and 612. Performing steps 610 and 612 may determine that the first sensor provides data that deviates from the second and third sensors. In step 610, it may be determined whether the first sensor value estimation 256 minus the second sensor value estimation 258 is greater than a delta sensor value threshold 262, and the first sensor value estimation 256 minus the third sensor value estimation 260 is also greater than delta sensor value threshold 262. Delta sensor value threshold 262 represents the maximum deviation of one sensor from the other two or more sensors in redundant sensor set 102 that may comprise valid data.

If step 610 evaluates to true, then method 600 may continue to step 612. In step 612, a first sensor confidence (conf1) 236 may be set to zero. Steps 610 and 612 may allow for the removal of the first sensor from quality controlled sensor set 232 when the first sensor provides data that deviates from the other two sensors. This may provide an additional check, for example, in the case that one sensor requires calibration.

Method 600 may continue onto step 616 after step 610 evaluates false, or after step 612 is performed. In further examples, however, method 300 may include step 616 without any of the other steps of method 600. In step 616, a quality controlled system measurement value 254 may be determined based on an average of two or more sensors included in the quality controlled sensor set 232. For example, if quality controlled sensor set 232 is determined to include the second and third sensors [S2, S3], then quality controlled system measurement value 254 may be determined from second sensor time series data 210 and third sensor time series data 212.

In examples, method 300 may further include any of the steps of method 700. For example, method 300 may include steps 702 and 704. In step 702, it may be determined whether first sensor value estimation 256 is greater than a maximum value threshold 266. Maximum value threshold 266 may represent the maximum valid sensor value, beyond which the sensor may be experiencing an error. If step 702 is evaluated to be true, then method 700 may continue with step 704. In step 704, first sensor confidence (conf1) 236 may be set to zero. This may allow for the removal of the first sensor [S1] from quality controlled sensor set 232.

When step 702 evaluates false, method 300 may further include steps 706, 708, and 710. In step 706, it may be determined whether the first sensor value estimation 256 is less than a minimum value threshold 264. In examples, minimum value threshold 264 may represent the noise level for a particular sensor.

If step 706 evaluates as true, method 700 may continue with steps 708 and 710. In step 708, first sensor confidence (conf1) 236 may be set to 1, and in step 710, first sensor value estimation 256 may be set to zero. This may help flag when the first sensor is functioning properly, but that the signal to noise is not high enough to include the first sensor data. By zeroing the data in step 710, this may prevent, a false indication of precipitation accumulation.

If step 706 evaluates false, then method 700 may continue with step 712. In step 712, the previously determined first sensor value estimation 256 and first sensor confidence (conf1) 236 may be retained.

In examples, method 300 may further include the steps of method 800, which begins with step 802. In step 802, a non-zero first sensor value estimation for a time within a persistence period may be determined after step 604. A persistence period may be any minimal period of time necessary verify whether a physical phenomenon that a sensor detects, such as a precipitation event, is physically occurring, and is not an intermittent sensor error.

In examples, method 800 may continue with step 804. In step 804, it may be determined if there are no other non-zero values for the first sensor during the persistence period. If step 804 evaluates to true, method 800 may continue to step 806. In step 806, first sensor value estimation 256 may be set to zero.

In examples, steps 802, 804, and 806 may help prevent sensors experiencing intermittent errors from being included in quality controlled sensor set 232. For example, when quality controlled sensor set 232 is being used to determine rain accumulation, method 800 may help prevent the accumulation of precipitation errors. This may further help prevent false adverse weather conditions alarms, such as an indication that ice may be accumulating on the wings of aircraft at an airport.

If step 804 evaluates false, method 800 may continue with step 808. In step 808, the first sensor value estimation may be retained.

Figure 9:
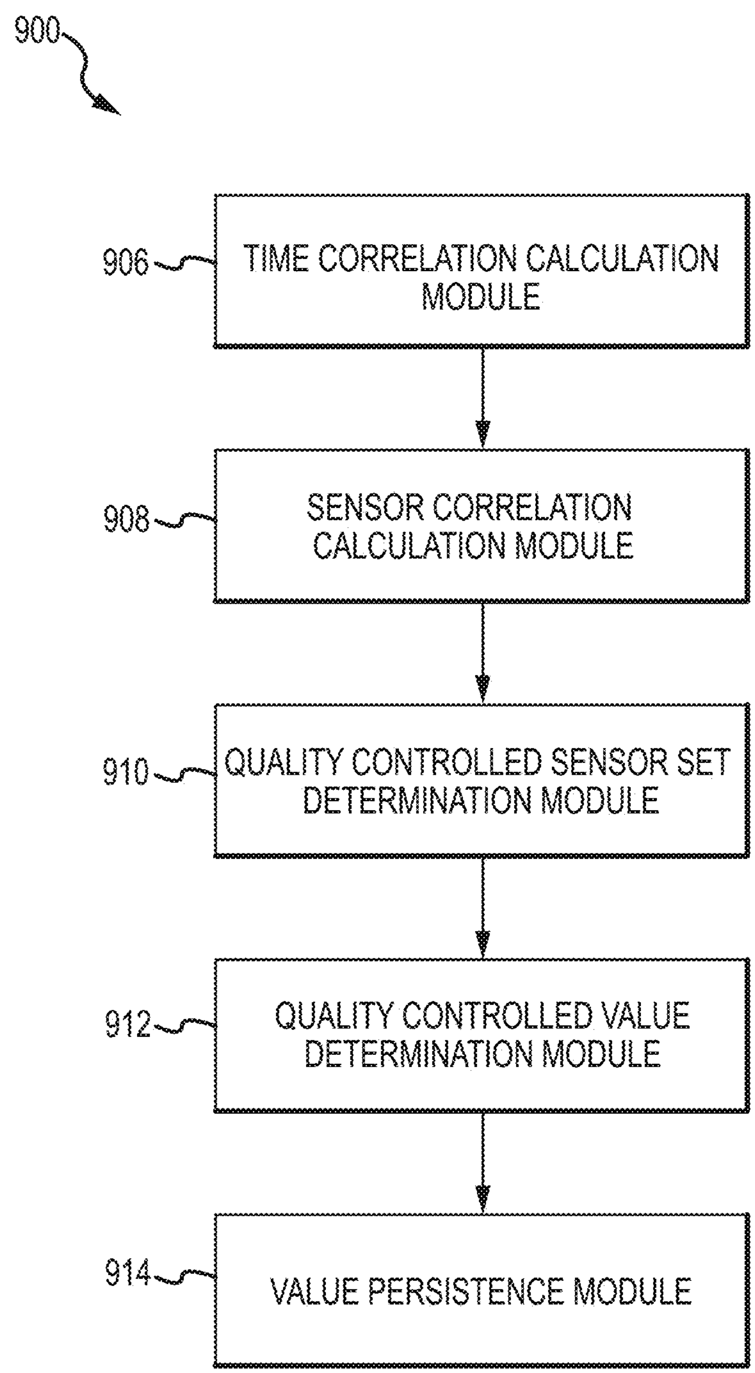
FIG. 9 depicts system 900 in accordance with an embodiment.

FIG. 9 depicts system 900. System 900 is configured to determine a quality controlled sensor set 232 from a redundant sensor set 102, including time correlation calculation module 906, sensor correlation calculation module 908, quality controlled sensor set determination module 910, quality controlled value determination module 912, and value persistence module 914, as will be further described below. System 900 may execute one or more processing routines to determine a quality controlled sensor set with a highest confidence level, or a quality controlled sensor value based on the quality controlled sensor set.

Time correlation calculation module 906 is configured to calculate a first time correlation coefficient (timec1) 214 and a first autocorrelation coefficient (autoc1) 216 based on a first sensor time series data 208, and to calculate a second time correlation coefficient (timec2) 218 and a second autocorrelation coefficient (autoc2) 220 based on a second sensor time series data 210. In examples, time correlation calculation module 906 may perform any of steps 302, 304, and 308, as described above.

Sensor correlation calculation module 908 is configured to calculate a first and second sensor correlation coefficient (crossc1,2) 226 based on the first sensor time series data 208 and the second sensor time series data 210. In examples, sensor correlation calculation module 908 may further perform any of the steps 306, 310, and 312, as described above.

Quality controlled sensor determination module 910 is configured to determine a quality controlled sensor set 232 with the highest confidence level. In examples, quality controlled sensor determination module 910 may perform any of the variations of step 307 described above, including any of the steps of methods 400 and 500.

Quality controlled value determination module 912 is configured to determine a quality controlled system measurement value 254 from the quality controlled sensor set 232. In examples, quality controlled value determination module 912 may perform any of the steps described in methods 600 and 700.

Value persistence module 914 is configured to determine if a first sensor value estimation 256 comprises persistent data. In examples, value persistence module 914 may perform any of the steps described in method 800.

Figure 10:
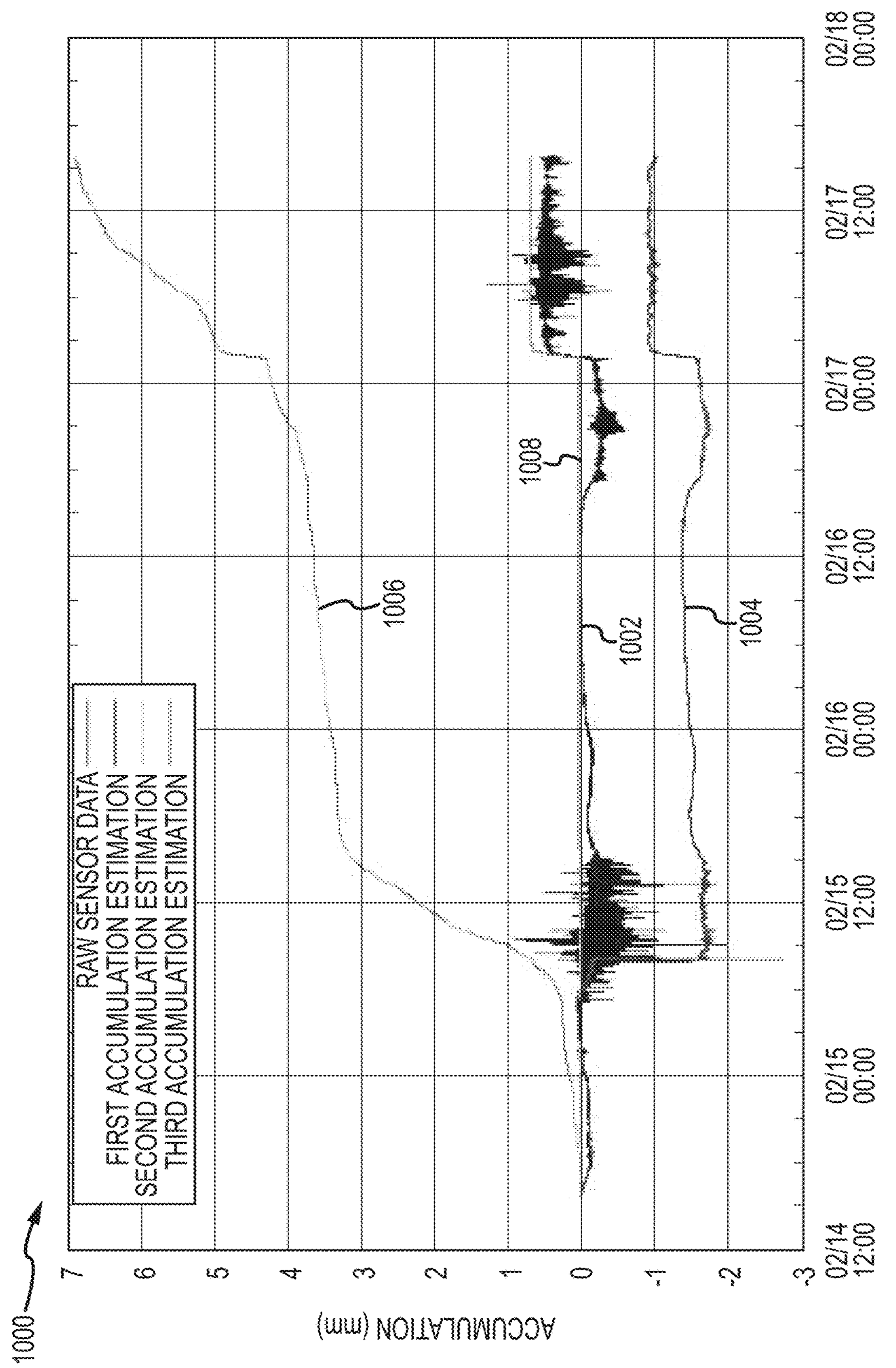
FIG. 10 depicts chart 1000 in accordance with an embodiment.

FIG. 10 depicts chart 1000. Chart 1000 includes raw sensor data 1002, first accumulation estimation 1004, second accumulation estimation 1006, and third accumulation estimation 1008. Chart 1000 depicts the accumulation of rain in millimeters (y-axis) as a function of time (x-axis).

Chart 1000 includes raw sensor data 1002 for a first rain gauge wire that is part of a multi-sensor redundant sensor system 202. As may be seen, raw sensor data 1002 provides negative values for sustained periods covering several hours, even though a rain gauge cannot receive a negative rain accumulation. In three sections centered on 02/15 at 12:00, 02/16 at 21:00, and 02/17 at 6:00, significant noise is also observed in raw sensor data 1002. At approximately 2:00 on 02/17, the baseline of raw sensor data 1002 raises from −0.2 mm to approximately 0.5 mm.

First accumulation estimation 1004, second accumulation estimation 1006, and third accumulation estimation 1008 include estimations of rain accumulation based on a quality controlled sensor set 234. First accumulation estimation 1004 represents a rain accumulation estimation based on a prior art algorithm comprising a simple integration of raw sensor data. As may be seen, first accumulation estimation 1004 includes a negative rain accumulation, which is clearly in error.

Second accumulation estimation 1006 represents a rain accumulation estimation based on a another prior art algorithm comprising a simple integration of raw sensor data 1002 after negative raw sensor data 1002 values are removed. As may be seen, second accumulation estimation 1006 depicts steady rain accumulation, an overestimation that is in error. In particular, during the first and second noisy periods of raw sensor data 1002 described above, second accumulation estimation 1006 indicates rapid rain accumulation, which is clearly in error.

Third accumulation estimation 1008 represents an accumulation estimate in accordance with an embodiment of the present application. The redundant sensor set 102 used to provide third accumulation estimation 1008 includes the first rain gauge wire that provides raw sensor data 1002, and at least one other rain gauge wire.

As may be seen in FIG. 10, third accumulation estimation 1008 is not affected by the three noisy sections of raw sensor data 1002 described above. Nor does third accumulation estimation 1008 capture the negative values found in raw sensor data 1002. Instead, third accumulation estimation 1008 maintains an accumulation estimate of zero until 02/17 at approximately 2:00, when it increases by 0.7 mm. This tracks the baseline of raw sensor data 1002, which also increases by approximately 0.7 mm, and captures an actual rain event.

Using the methods and system described above, it is possible to determine a quality controlled sensor set 232 from a redundant sensor set 102 that offers the highest confidence level, with a bias for providing the highest number of sensors. By identifying a dynamic quality controlled sensor set based on a combination of information from a single sensor's time series data, and information receive concurrently from multiple time sensors, it may be possible to provide a quality controlled sensor set that dynamically filters out sensors that experience intermittent or persistent errors.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A method for determining a quality controlled sensor set from a redundant sensor set, the method comprising:

calculating a first time correlation coefficient (timec1) and a first autocorrelation coefficient (autoc1) based on a first sensor time series data;

calculating a second time correlation coefficient (timec2) and a second autocorrelation coefficient (autoc2) based on a second sensor time series data;

calculating a first and second sensor correlation coefficient (crossc1,2) based on the first sensor time series data and the second sensor time series data;

determining the quality controlled sensor set with a highest confidence level based on the timec1, the autoc1, the timec2, the autoc2, and the crossc1,2.

2. The method of claim 1, wherein determining the quality controlled sensor set with the highest confidence level further comprises including the first sensor and the second sensor in the quality controlled sensor set upon determining that a first and second sensor confidence (conf1,2) is over a confidence threshold, wherein the $$conf1,2 = \sqrt[5]{timec1 * autoc1 * timec2 * autoc2 * crossc1,2}.$$

3. The method of claim 1, wherein determining the quality controlled sensor set with the highest confidence level further comprises:

determining a first sensor confidence (conf1) based on the timec1 and the autoc1;

determining a second sensor confidence (conf2) based on the timec2 and the autoc2; and including the first sensor in the quality controlled sensor set upon determining that the conf1 is greater than the conf2.

4. The method of claim 1, further comprising:

calculating a third time-correlation coefficient (timec3) and a third autocorrelation coefficient (autoc3) based on a third sensor time series data;

calculating a second and third sensor correlation coefficient (crossc2,3) based on the second sensor time series data and the third sensor time series data; and calculating a first and third sensor correlation coefficient (crossc1,3) based on the first sensor time series data and the third sensor time series data, wherein determining the quality controlled sensor set with the highest confidence level is further based on the timec3, autoc3, and crossc1,3.

5. The method of claim 4, wherein determining the quality controlled sensor set with the highest confidence level further comprises including the first sensor, the second sensor, and the third sensor in the quality controlled sensor set upon determining that a first, second, and third sensor confidence (conf1,2,3) is over a confidence threshold and the third in the quality controlled sensor set, wherein the $$conf1,2,3 = \sqrt[9]{\frac{timec1 * autoc1 * timec2 * autoc2 * timec3 *}{autoc3 * crossc1,2 * crossc2,3 * crossc1,3}}.$$

6. The method of claim 4, further comprising:

calculating a third time-correlation coefficient (timec3) and a third autocorrelation coefficient (autoc3) based on a third sensor time series data; and calculating a second and third sensor correlation coefficient (crossc2,3) based on the second sensor time series data and the third sensor time series data, wherein determining the quality controlled sensor set with the highest confidence level further comprises including the third sensor in the quality controlled sensor set upon determining that a second and third sensor confidence (conf2,3) is over the confidence threshold, wherein the $$conf2,3 = \sqrt[5]{timec2 * autoc2 * timec3 * autoc3 * crossc2,3}.$$

7. The method of claim 1, further comprising:

determining a best-fit curve to the first sensor time series data to determine a first sensor value estimation.

8. The method of claim 4, wherein determining the quality controlled sensor set with the highest confidence level further comprises:

determining a first sensor value estimation from the first sensor time series data;

determining a second sensor value estimation from the second sensor time series data;

determining a third sensor value estimation from the third sensor time series data;

upon determining that the first sensor value estimation minus the second sensor value estimation is greater than a delta sensor value threshold, and the first sensor value estimation minus the third sensor value estimation is also greater than the delta sensor value threshold, setting a first sensor confidence (conf1) to zero.

9. The method of claim 1, further comprising:

determining a first sensor value estimation;

upon determining that the first sensor value estimation is less than a minimum value threshold, setting the first sensor value estimation to zero and setting a first sensor confidence (conf1) to 1.

10. The method of claim 1, further comprising:

determining a first sensor value estimation; and upon determining that the first sensor value estimation is greater than a maximum value threshold, setting a first sensor confidence (conf1) to 0.

11. The method of claim 1, further comprising:

determining a quality controlled system measurement value based on an average of two or more individual sensor value estimations for the quality controlled sensor set.

12. The method of claim 1, further comprising:

determining a non-zero first sensor value estimation for a time within a persistence period; and upon determining that there are no other non-zero values for the first sensor during the persistence period, setting the first sensor value estimation to zero.

13. A system for determining a quality controlled sensor set from a redundant sensor set, the system comprising:

a time correlation calculation module configured to calculate a first time correlation coefficient (timec1) and a first autocorrelation coefficient (autoc1) based on a first sensor time series data, and calculate a second time correlation coefficient (timec2) and a second autocorrelation coefficient (autoc2) based on a second sensor time series data;

a sensor correlation calculation module configured to calculate a first and second sensor correlation coefficient (crossc1,2) based on the first sensor time series data and the second sensor time series data; and a quality controlled sensor determination module configured to determine the quality controlled sensor set with a highest confidence level based on the timec1, the autoc1, the timec2, the autoc2, the crossc1,2, and the crossc2,3.

14. The system of claim 13, wherein the quality controlled sensor determination module is further configured to determine the quality controlled sensor set with the highest confidence level by including the first sensor and the second sensor in the quality controlled sensor set upon determining that a first and second sensor confidence (conf1,2) is over a confidence threshold, wherein the $$conf1,2 = \sqrt[5]{timec1 * autoc1 * timec2 * autoc2 * crossc1,2}.$$

15. The system of claim 13, wherein the quality controlled sensor determination module is further configured to determine the quality controlled sensor set with the highest confidence level further by determining a first sensor confidence (conf1) based on the timec1 and the autoc1, determining a second sensor confidence (conf2) based on the timec2 and the autoc2, and including the first sensor in the quality controlled sensor set upon determining that the conf1 is greater than the conf2.

16. The system of claim 13, wherein the time correlation calculation module is further configured to calculate a third time-correlation coefficient (timec3) and a third autocorrelation coefficient (autoc3) based on a third sensor time series data; the sensor correlation calculation module is further configured to calculate a second and third sensor correlation coefficient (crossc2,3) based on the second sensor time series data and the third sensor time series data, and calculate a first and third sensor correlation coefficient (crossc1,3) based on the first sensor time series data and the third sensor time series data; and the quality controlled sensor determination module is further configured to determine the quality controlled sensor set with the highest confidence level based on the timec3, autoc3, and crossc1,3.

17. The system of claim 16, wherein the quality controlled sensor determination module is further configured to include the first sensor, the second sensor, and the third sensor in the quality controlled sensor set upon determining that a first, second, and third sensor confidence (conf1,2,3) is over a confidence threshold and the third in the quality controlled sensor set, wherein the $$conf1,2,3 = \sqrt[9]{\begin{matrix} timec1 * autoc1 * timec2 * autoc2 * timec3 * \\ autoc3 * crossc1,2 * crossc2,3 * crossc1,3 \end{matrix}}.$$

18. The system of claim 16, wherein the time correlation calculation module is further configured to calculate a third time-correlation coefficient (timec3) and a third autocorrelation coefficient (autoc3) based on a third sensor time series data; the sensor correlation calculation module is further configured to calculate a second and third sensor correlation coefficient (crossc2,3) based on the second sensor time series data and the third sensor time series data, and the quality controlled sensor set determination module is further configured to include the third sensor in the quality controlled sensor set upon determining that a second and third sensor confidence (conf2,3) is over the confidence threshold, wherein the $$conf2,3 = \sqrt[5]{timec2 * autoc2 * timec3 * autoc3 * crossc2,3}.$$

19. The system of claim 13, further comprising:

a quality controlled value determination module configured to determine a quality controlled system measurement value based on an average of two or more individual sensor value estimations for the quality controlled sensor set.

20. The system of claim 13, further comprising:

a value persistence module configured to determine a non-zero first sensor value estimation for a time within a persistence period, and upon determining that there are no other non-zero values for the first sensor during the persistence period, set the first sensor value estimation to zero.

* * * * *